US008611946B2

(12) United States Patent
Cormier et al.

(10) Patent No.: US 8,611,946 B2
(45) Date of Patent: Dec. 17, 2013

(54) METHODS AND SYSTEMS FOR CONFIGURING MULTI-MODE MOBILE STATIONS

(75) Inventors: Jean-Philippe Cormier, Ottawa (CA); Trevor Plestid, Ottawa (CA); Jeff Wirtanen, Kanata (CA)

(73) Assignee: Blackberry Limited, Waterloo, Ontario (CA)

( * ) Notice: Subject to any disclaimer, the term of this patent is extended or adjusted under 35 U.S.C. 154(b) by 1817 days.

(21) Appl. No.: 11/627,187

(22) Filed: Jan. 25, 2007

(65) Prior Publication Data

US 2008/0182614 A1 Jul. 31, 2008

(51) Int. Cl.
*H04M 1/00* (2006.01)
*H04B 7/00* (2006.01)

(52) U.S. Cl.
USPC .............. 455/552.1; 455/450; 455/550.1; 455/553.1

(58) Field of Classification Search
USPC .......... 455/550.1, 552.1, 450, 553.1; 370/310
See application file for complete search history.

(56) References Cited

U.S. PATENT DOCUMENTS

| 5,420,985 | A | | 5/1995 | Cantrell et al. |
| 5,946,634 | A | * | 8/1999 | Korpela ............... 455/552.1 |
| 6,430,619 | B1 | | 8/2002 | Sitaraman et al. |
| 6,466,571 | B1 | | 10/2002 | Dynarski |
| 6,477,373 | B1 | | 11/2002 | Rappaport et al. |
| 6,571,095 | B1 | | 5/2003 | Kookli |
| 6,738,361 | B1 | | 5/2004 | Immonen |
| 6,847,610 | B1 | | 1/2005 | Suumaki et al. |
| 6,970,445 | B2 | | 11/2005 | O'Neill et al. |
| 6,981,047 | B2 | | 12/2005 | Hanson et al. |
| 7,002,963 | B1 | | 2/2006 | Buyukkoc et al. |

(Continued)

FOREIGN PATENT DOCUMENTS

EP 1 148 753 10/2001
EP 1 176 766 1/2002

(Continued)

OTHER PUBLICATIONS

Office Action dated Oct. 30, 2009 from related U.S. Appl. No. 11/549,404.

(Continued)

*Primary Examiner* — Wesley Kim

(57) ABSTRACT

Devices and methods are provided for configuring multi-mode mobile stations. When the number of data sessions available to a multi-mode mobile station changes, the multi-mode mobile station sends information to configuration server sufficient to determine the capability of the network and identify the multi-mode mobile station. The number of data sessions available to a multi-mode mobile station may change due to the multi-mode mobile entering a network, changing radio access technologies (RAT) used in the network or changing radio network controllers having the same or a different respective number of data sessions. A configuration server receives the information sent by the multi-mode mobile station and selects configuration information for configuring the multi-mode mobile station to support services/applications that are subscribed to by a user of the multi-mode mobile station. In some embodiments the selection of configuration information is made at least in part based on the information received by the configuration server from the multi-mode mobile station. Once the configuration information has been selected, the configuration server sends the configuration information to the multi-mode mobile station. The multi-mode mobile station receives the multi-mode mobile station specific configuration information and automatically configures itself according to the configuration information.

20 Claims, 6 Drawing Sheets

(56) References Cited

U.S. PATENT DOCUMENTS

| | | | |
|---|---|---|---|
| 7,050,445 B1 | 5/2006 | Zellner et al. | |
| 7,061,887 B2 | 6/2006 | Fan | |
| 7,082,130 B2 | 7/2006 | Borella et al. | |
| 7,099,681 B2 | 8/2006 | O'Neill | |
| 7,324,543 B2 | 1/2008 | Wassew et al. | |
| 7,328,020 B2 | 2/2008 | Masuda | |
| 7,406,057 B2 | 7/2008 | Isomaki et al. | |
| 7,581,009 B1 | 8/2009 | Hsu et al. | |
| 7,590,122 B2 | 9/2009 | Constantinof | |
| 2001/0026538 A1 | 10/2001 | Bruss | |
| 2002/0126633 A1 | 9/2002 | Mizutani et al. | |
| 2002/0133600 A1* | 9/2002 | Williams et al. | 709/228 |
| 2002/0174220 A1 | 11/2002 | Johnson | |
| 2003/0117983 A1 | 6/2003 | Ton et al. | |
| 2003/0142650 A1 | 7/2003 | Fan | |
| 2004/0127237 A1 | 7/2004 | Hurtta | |
| 2004/0185867 A1 | 9/2004 | Wassew et al. | |
| 2005/0043032 A1 | 2/2005 | Choi | |
| 2005/0053068 A1 | 3/2005 | Toth et al. | |
| 2005/0070290 A1* | 3/2005 | Baggstrom et al. | 455/445 |
| 2005/0122946 A1 | 6/2005 | Won | |
| 2005/0148359 A1* | 7/2005 | Joeressen | 455/552.1 |
| 2005/0207340 A1 | 9/2005 | O'Neill | |
| 2006/0073826 A1 | 4/2006 | Miernik | |
| 2006/0153118 A1 | 7/2006 | Bailey | |
| 2006/0173860 A1 | 8/2006 | Ikebe | |
| 2006/0233128 A1 | 10/2006 | Sood et al. | |
| 2007/0030826 A1 | 2/2007 | Zhang et al. | |
| 2007/0082699 A1* | 4/2007 | Karaoguz et al. | 455/553.1 |

FOREIGN PATENT DOCUMENTS

| | | |
|---|---|---|
| EP | 1 478 157 | 11/2004 |
| EP | 1 492 364 A | 12/2004 |
| EP | 1 655 975 A1 | 5/2006 |
| EP | 1 686 752 | 8/2006 |
| EP | 1 653 655 B1 | 11/2006 |
| EP | 1 763 266 | 3/2007 |
| GB | 2 373 676 A | 9/2002 |
| JP | 2001-309432 | 11/2001 |
| JP | 2002-536890 | 10/2002 |
| JP | 2004/187094 | 7/2004 |
| JP | 2004 246833 | 9/2004 |
| JP | 2004-363730 | 12/2004 |
| JP | 2006-129490 A | 5/2006 |
| JP | 2006-195749 | 5/2006 |
| KR | 516917 | 9/2005 |
| KR | 10-2006-0058558 | 5/2006 |
| WO | 00/45613 | 8/2000 |
| WO | 0152583 | 7/2001 |
| WO | WO 01/52583 | 7/2001 |
| WO | WO 0152583 A1 | 7/2001 |
| WO | 2002067605 | 8/2002 |
| WO | WO 03/017522 | 2/2003 |
| WO | 03063441 | 7/2003 |
| WO | 03084171 | 10/2003 |
| WO | 2004/059994 | 7/2004 |
| WO | WO 2005/084061 | 9/2005 |
| WO | 2005109988 | 11/2005 |
| WO | 2006/109159 | 10/2006 |

OTHER PUBLICATIONS

3G TS 23.060 v3.4.0, Jul. 2000 (Jul. 1, 2000), 3$^{rd}$ Generation Partnership Project; Technical Specification Group Services and System Aspects; General Packet Radio Service (GPRS); Service Description; Stage 2 (Release 1999).
Office Action dated Aug. 7, 2009 from related U.S. Appl. No. 11/549,390, 23 pages.
Notice of References Cited from related U.S. Appl. No. 11/549,404 issued on May 8, 2009.
Kaaranen H. et al., "UMTS Networks: Architecture, Mobility and Services", 2$^{nd}$ Edition, Apr. 2005, pp. 358-360.
Koodli, R.; Puuskari, M., "Supporting packet-data QoS in next-generation cellular networks," IEEE Communications Magazine, vol. 39, No. 2, pp. 180-188, Feb. 2001 URL: http://ieeexplore.ieee.org/stamp/stamp.jsp?anumber=900650&isnumber=19494.
Office Action dated Nov. 28, 2008 for U.S. Appl. No. 11/549,394.
Office Action dated Dec. 17, 2008 for U.S. Appl. No. 11/549,404.
Office Action dated Feb. 6, 2009 for U.S. Appl. No. 11/549,390.
3GPP TSG Core Network and Terminals: "Mobile radio interface Layer 3 specification; Core network protocols; Stage 3" 3GPP TS 24.008 V7.4.0 [Online] Jun. 2006 pp. 1, 35-161, 206-229, 284-318, 421-477, 502-521 XP002408953 Retrieved from the Internet: URL: http://www.3gpp.org/ftp/Specs/archive/24_series/24.008/24008-740.zip [retrieved on Nov. 24, 2006].
English translation of Office Action dated Mar. 25, 2010 from related Japanese Patent Application No. 2007-217667.
Notice of References Cited that issued on Apr. 30, 2010 from related U.S. Appl. No. 11/549,404.
Soursos, S. et al., "Pricing differentiated services in the GPRS environment", 2001, In Proceedings of the First Workshop on Wireless Mobile internet, Rome, Italy, WMI '01. ACM, New York, NY, DOI= http://doi.acm.org/10.1145/381472.381582, pp. 62-68.
Ozianyi, Vitalis G. et al., "A Novel Pricing Approach for QoS Enabled 3G Networks", Icn, The IEEE Conference on Local Computer Networks 30th Anniversary (LCN'05), 2005, 8 pages total.
"Combining evidence for automatic Web session identification", Daqing He et al., Information Processing and Management (2002).
English translation of a Korean Office Action dated Dec. 10, 2012 from related Korean Patent Application No. 10-2009-7009628.
Office Action dated Feb. 13, 2012 from related Canadian Patent Application No. 2,666,318.
English-language translation of an Office Action from related Korean Patent Application No. 10-2009-7009627.
IEEE, Qiong Zhang et al., 2003, Early Drop Scheme for Providing Absolute QoS Differentiation in Optical Burst-Switched Networks.
English-language translation of an Office Action from related Korean Patent Application No. 10-2009-7009628.
English-language translation of Korean Patent No. 516917.
English-language translation of an Office Action mailed on Jun. 4, 2012 from related Japanese Application No. 2010-216157.
English-language translation of an Office Action mailed on Jun. 7, 2012 from related Japanese Application No. 2009-531701.
English-language translation of an Office Action mailed on Jun. 7, 2012 from related Japanese Application No. 2009-531702.
English-language translation of JP 2004-363730 obtained Jul. 4, 2012 from http://www.ipdl.inpit.go.jp/homepg_e.ipdl.
English-language translation of an Office Action dated Jul. 27, 2011 from related Japanese Patent Application No. 2009-531701.
Jianfeng Chen et al, A Service Flow Management Strategy for IEEE 802.16 Broadband Wireless Access Systems in TDD Mode, IEEE, 2005.
English-language translation of an Office Action dated Jul. 27, 2011 from related Japanese Patent Application No. 2009-531702.
English-language translation of an Office Action dated Aug. 4, 2011 from related Korean Patent Application No. 10-2011-7015483.
English-language translation of abstract of JP 2001-309432.
Office Action dated Aug. 26, 2011 from related Australian Patent Application No. 2007312905.
Kaaranen, H. et al., "UMTS Networks: Architecture, Mobility and Services", 2/e, ISBN: 978-0-470-01103-4, Wiley & Sons, LTD, pp. 169-170, Apr. 2005.
Extended European Search Report dated Oct. 30, 2012 from related European Patent Application No. 07872821.90.
Examiner's Report issued on Oct. 5, 2011 for corresponding Canadian Patent Application No. 2,618,912, 4 pages.
English-language translation of an Office Action from corresponding Korean Patent Application No. 10-2009-7009628.
Office Action dated May 11, 2012 from related U.S. Appl. No. 11/549,390.

* cited by examiner

METHODS AND SYSTEMS FOR CONFIGURING MULTI-MODE MOBILE STATIONS

FIELD OF THE APPLICATION

The application relates to configuring multi-mode mobile stations.

BACKGROUND

Multi-mode mobile stations are mobile stations (MS) that have the capability to access different types of radio access systems. Existing multi-mode mobile stations include mobile stations with a combination of Global System for Mobile Communications/General Packet Radio Services (GSM/GPRS) and Code Division Multiple Access (CDMA) capabilities, and mobile stations with a combination of GSM/GPRS/Universal Mobile Telecommunications System (UMTS) and CDMA capabilities, and combinations that include wireless large area network (WLAN) capabilities.

When a multi-mode mobile station enters a new network and when the multi-mode mobile station changes to an alternate radio access technology (RAT) within a network, the number of concurrent data sessions, or more specifically packet data protocol (PDP) contexts in 3GPP networks such as GSM/GPRS and UMTS, that are supported by the new network or alternate RAT may be different than a number supported by a previous network that the multi-mode mobile station came from or a previous RAT the multi-mode mobile station was using before changing to the alternate RAT. When the multi-mode mobile station enters a new network or changes to an alternate RAT that has only a single PDP context, this can be problematic if the multi-mode mobile station has an always-on service/application. The always-on service application will utilize the single PDP context available to the multi-mode mobile station and other services/applications will have no access to the network, as the network does not allow any subsequent concurrent PDP context activations on alternate subscribed access point name (APN) or data service. It may be possible for the multi-mode mobile station to occasionally disconnect the PDP context of the always-on application to allow other services/applications access to the network, but then the always-on application is not technically always-on, which may result in delays in the always-on service/application that a user of the multi-mode mobile station cannot tolerate. More generally, a problem can also arise when entering a new network or an alternate RAT in which the number of PDP contexts is less than the number of PDP contexts supported in a previous network or RAT.

GPRS supports multiple PDP contexts between multi-mode mobile stations and a GPRS enabled network. In some situations, Universal Mobile Telecommunications System (UMTS) supports only a single packet data protocol (PDP) context between a multi-mode mobile station and a UTMS enabled network. A multi-mode mobile station can support multiple PDP contexts for enabling multiple services/applications to occur simultaneously between the multi-mode mobile station and the network. Some examples of services/applications include wireless application protocol (WAP), mobile message service (MMS), push e-mail, WAN data modem and SIP/IMS (Session Initiation Protocol/IP Multimedia Subsystem) services (e.g. Push to talk over cellular).

Global System for Mobile Communications (GPRS) is an example of a second generation (2G) RAT, while UMTS is an example of a third generation (3G) RAT.

BRIEF DESCRIPTION OF THE DRAWINGS

Embodiments will now be described with reference to the attached drawings in which.

DETAILED DESCRIPTION OF THE EMBODIMENTS

Figure 1:
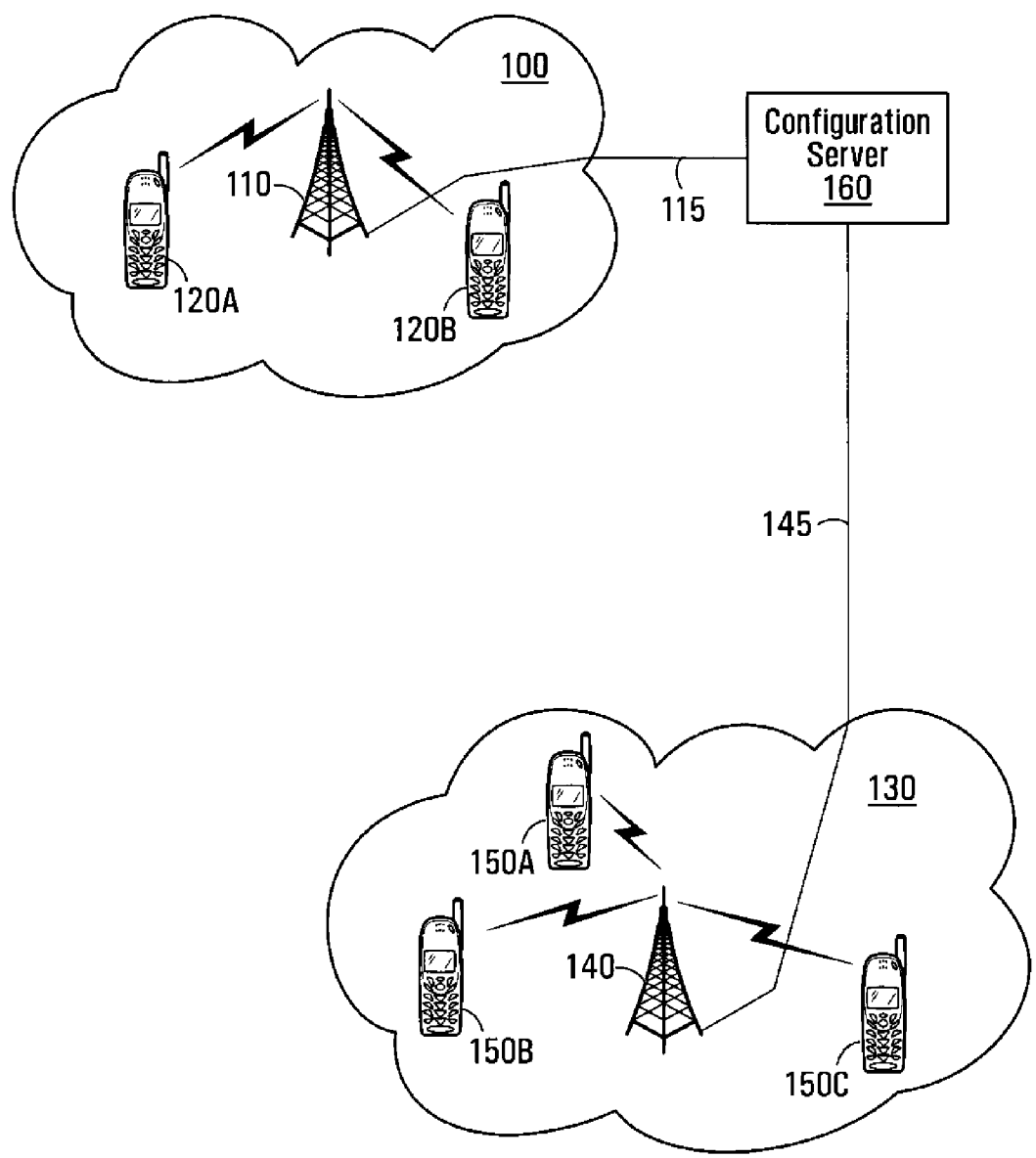
FIG. 1 is a block diagram of a system used to configure a multi-mode mobile station over the air.

According to a first aspect there is provided a method for configuring a multi-mode mobile station comprising: the multi-mode mobile station sending information comprising at least an identification of the multi-mode mobile station, an identification of a network serving the multi-mode mobile station and an identification of a radio access technology (RAT) in the network upon an occurrence of an event that may result in a change in the number of data sessions available to the multi-mode mobile station; at least when there is a change in the number of data sessions available to the multi-mode mobile station the multi-mode mobile station receiving over-the-air, configuration information based on the information sent by the multi-mode mobile station, the configuration information comprising a respective configuration profile for each of at least one data session for use by the multi-mode mobile station; the multi-mode mobile station configuring itself according to the configuration information.

In some embodiments, sending data for N services/applications on the one PDP context comprises sending data to a specific network or relay network.

According to a second aspect there is provided a method for configuring a multi-mode mobile device over the air comprising: receiving information comprising at least an identification of the multi-mode mobile station, an identification of a network serving the multi-mode mobile station and an identification of a radio access technology (RAT) used in the network; selecting configuration information based on the received information for configuring a respective data session used by the multi-mode mobile station, the configuration information comprising a respective configuration profile for each of at least one data session; sending the configuration information over-the-air to the multi-mode mobile station.

In some embodiments, sending data for N services/applications on one PDP context comprises sending data to a specific network or relay network.

In some embodiments, defining a configuration profile comprises defining a service profile for each service/application operating on a respective data session.

In some embodiments, the method further comprises generating the configuration information based on information about the network and the RAT used in the network.

In some embodiments, information about the network and the RAT used in the network is provided by a network service provider associated with the network to aid in generating the configuration information.

In some embodiments, the method further comprises updating configuration information based on updated information about one or both of the network and the RAT used in the network.

In some embodiments, the method further comprises maintaining information associated with at least one multi-mode mobile station.

According to a third aspect there is provided an apparatus comprising: a receiver for receiving information comprising at least an identification of a multi-mode mobile station, an identification of a network serving the multi-mode mobile station and an identification of a radio access technology (RAT) used in the network; processing logic for selecting configuration information for configuring a respective data session used by the multi-mode mobile station based on the received information; computer readable memory for storing configuration information and multi-mode mobile station specific information used in selecting the appropriate configuration information; a transmitter for sending the appropriate configuration information.

In some embodiments, the apparatus further comprises: a data store in the computer readable memory comprising, for each network of a plurality of networks each having at least one RAT, an identification of a number of data sessions supported by a respective RAT used in each network; wherein selecting the configuration information comprises selecting configuration information to configure the multi-mode mobile station with a total number of data sessions no larger than a number supported by the respective RAT of a given network, as identified in the data store.

In some embodiments, the apparatus further comprises: a respective configuration profile definition for each of at least two different groups of supported data sessions, the at least two different groups each having a different number of data sessions; wherein the processing logic selects the configuration information by selecting the configuration profile for the determined number of supported data sessions.

In some embodiments, the processing logic generates the configuration information based on information about the network and the RAT used in the network.

According to a fourth aspect there is provided a multi-mode mobile station comprising: a wireless access radio for sending information upon an occurrence of an event that may result in a change in the number of data sessions available to the multi-mode mobile station, the information comprising at least an identification of the multi-mode mobile station, an identification of a network serving the multi-mode mobile station and an identification of a radio access technology (RAT) in the network; at least when there is a change in the number of data sessions available to the multi-mode mobile station the wireless access radio receiving over-the-air, configuration information based on the information sent by the multi-mode mobile station, the configuration information comprising a respective configuration profile for each of at least one data session for use by the multi-mode mobile station; a configuration processing function for configuring the multi-mode mobile station according to the configuration information.

In another embodiment, there is provided a multi-mode mobile station comprising: means for sending from the multi-mode mobile station information sufficient to determine the capability of a network upon an occurrence of an event that may result in a change in the number of data sessions available to the multi-mode mobile station; means for receiving over-the-air, at least when there is a change in the number of data sessions available to the multi-mode mobile station, configuration information based on the information sent by the multi-mode mobile station, the configuration information comprising a respective configuration profile for each of at least one data session for use by the multi-mode mobile station; and means for configuring the multi-mode mobile station according to the configuration information.

In yet another embodiment, there is provided a computer readable medium storing program instructions executable by a processor of a multi-mode mobile station for causing said a multi-mode mobile station to perform methods described above.

In a further embodiment, there is provided a computer readable medium storing program instructions executable by a processor of a computing device for causing said computing device to perform methods described above.

In yet a further embodiment, there is provided a system comprising the apparatus and a plurality of multi-mode mobile stations as described above.

In general, a set of networks accessible by a mobile station due to the mobile station's mobility will include networks that support differing numbers of PDP contexts. Methods are provided for configuring mobile stations when they move between different networks and/or RATs, for example to facilitate the mobility of a mobile station from a first network to a second network that supports fewer PDP contexts. FIG. 1 will be used to illustrate a specific example of this.

Referring now to FIG. 1, a system will be described for configuring a multi-mode mobile station over-the-air. A first network 100 includes a base station 110 for wireless communication with multi-mode mobile stations within range of the base station 110. Multi-mode mobile stations 120A and 120B are shown in wireless communication with base station 110. A second network 130 is shown including a base station 140 in wireless communication with multiple multi-mode mobile stations 150A, 150B and 150C. The first and second base stations 110, 140 are each coupled to configuration server 160. While only one base station 110, 140 is shown in each of respective networks 100, 130, it is to be understood that in some embodiments a network includes multiple cells each having a respective base station. Base station 110 is coupled to configuration server 160 by landline 115 and base station 140 is coupled to configuration server 160 by a landline 145. While only two networks are shown, the number of networks that are connected to configuration server 160 is implementation specific and may be greater than the two networks shown in FIG. 1. In some embodiments, networks may overlap somewhat in geographic areas in which they are located.

For the purpose of this example, it is assumed that network 100 supports three PDP contexts/multi-mode mobile station, while network 130 supports one PDP context/multi-mode mobile station. In a specific example, a first network 100 that supports three PDP contexts/multi-mode mobile station is a GPRS network and a second network 130 that supports one PDP context/multi-mode mobile station is a UMTS network. More generally, the first network supports N PDP contexts and the second network supports N−X PDP contexts, where X is less than or equal to N−1.

In some embodiments the connections illustrated in FIG. 1 as landlines 115, 145 could be other than a wired connection, for example the connection between base stations 110 and 140 and configuration server 160 could be wireless connections or a combination of wireless connections and land lines. The connections may span other networks and/or network components, and may represent logical and/or physical connections. For example, the connections could be in a core network of a service provider or the connections could be outside of the core network of service provider. Furthermore, the connection could be for example L3 signalling based or IP based.

When multiple base stations are employed in a single network the multiple base stations may each be coupled to one or more base station controllers (BSC) (not shown). In some implementations, the one or more BSC in the single network are each connected to the configuration server 160.

In operation, when a multi-mode mobile station, for example multi-mode mobile station 120A enters a network, for example network 100, the multi-mode mobile station 120A sends information to configuration server 160 sufficient for the configuration server 160 to determine the capability of the network 100 and identify the multi-mode mobile station 120A. In some embodiments, the multi-mode mobile station sends the information directly to the configuration server. In some embodiments, the multi-mode mobile station sends the information to an access network where the information is extracted and a message including the information is sent to the configuration server. In some embodiments the information sent by the multi-mode mobile station 120A includes at least an identification of the multi-mode mobile station 120A sending the information, an identification of the network 100 serving the multi-mode mobile station 120A and an identification of a RAT used in the network 100.

The configuration server 160 receives the information sent by the multi-mode mobile station 120A. The configuration server 160 selects configuration information for configuring the multi-mode mobile station 120A to enable PDP contexts. The configuration information includes a respective configuration profile for each of at least one PDP context for use by the multi-mode mobile station. In some embodiments, a respective configuration profile for each of at least one PDP context includes a service profile for each service/application operating on each respective PDP contexts. In some implementations, configuration information is sent as separate configuration profiles for each of a number of individual PDP contexts and as a combined group of configuration profiles for all of the PDP contexts at substantially the same time. The multi-mode mobile station then chooses the appropriate configuration information from the separate configuration profiles or the group of configuration profiles depending on for example, the current RAT.

In some embodiments, the configuration information is selected so as to limit the number of concurrent PDP contexts to be enabled to be no more than a number supported in the new network, RAT or a network radio controller (RNC). In such embodiments, the configuration server determines how many concurrent PDP contexts on a mobile station are supported by the new network or RAT. This may involve performing a local table/database lookup, or a remote query to name a few examples, using the network identifier and/or RAT type.

The selection of configuration information may also involve selectively managing PDP contexts associated with services/applications that are subscribed to by a user of the multi-mode mobile station 120A. For example, the multi-mode mobile station may use N PDP contexts where N−X are supported, by selective prioritization of services/applications and actions of a user of the multi-mode mobile station. This involves determining what services/applications are subscribed to by the multi-mode mobile station. This also may involve performing a local table/database lookup, or a remote query to name a few examples, using the identification of the mobile station.

More generally, in some embodiments the selection of configuration information is made at least in part based on the information received by the configuration server 160 from the multi-mode mobile station 120A. The network identifier or RAT type used to look up the number of PDP contexts supported for the new network or RAT provide an example of this.

Once the configuration information has been selected, the configuration server 160 sends the configuration information to the multi-mode mobile station 120A. In the illustrated example, the configuration server 160 sends the configuration information to base station 110 over landline 115. Base station 110 then transmits the configuration information over the air to the multi-mode mobile station 120A.

The multi-mode mobile station 120A receives the configuration information that is specific to the multi-mode mobile station 120A based on the information it sent to the configuration server 160. The multi-mode mobile station 120A then automatically configures itself according to the received configuration information.

The above example is described in the context of multi-mode mobile station 120A entering network 100, assumed to be a new network. Similar steps occur in the multi-mode mobile station 120A and the configuration server 160 when the multi-mode mobile station changes to an alternate RAT within the same network. For example, different areas within a network may have different RATs. When roaming within a network, the multi-mode mobile station may detect that the RAT used at the current location in the network has changed from a previous location in the network. The multi-mode mobile station notifies the configuration server of this change and obtains new configuration information for use in the new RAT.

In a further example, similar steps occur in the multi-mode mobile station 120A and the configuration server 160 when the multi-mode mobile station changes from a first radio network controller (RNC) to a second RNC within the same network in which both RNCs use the same RAT. The two RNCs may support the same or a different number of PDP contexts. A RNC controls the use and the reliability of radio resources in the network. RNC functionality may be found in the base station, a relay station between the base station and the multi-mode mobile station or elsewhere in the network. As the multi-mode mobile station moves within the network it may encounter different RNCs supporting different geographical regions of the network. These different RNCs may support the same or a different numbers of PDP contexts, even though they support the same RAT.

More generally, similar steps occur in the multi-mode mobile station 120A and the configuration server 160 upon an occurrence of an event that may result in a change in the number of PDP contexts available to the multi-mode mobile station. The multi-mode mobile station receives over-the-air configuration information based on the information sent by the multi-mode mobile station at least when there is a change in the number of PDP contexts available to the multi-mode mobile station. In some embodiments, the configuration server sends configuration information every time the multi-mode mobile station sends information, whether the number of PDP contexts available to the multi-mode mobile station changes or not. Therefore, the multi-mode mobile station receives the configuration information and configures itself every time it sends its information. In some embodiments, the configuration server sends configuration information only when the configuration server determines the number of PDP contexts available to the multi-mode mobile station changes.

Therefore, the multi-mode mobile station receives the configuration information and configures itself only when the number of PDP contexts available to the multi-mode mobile station changes as determined by the configuration server, based on the information sent by the multi-mode mobile station.

The information sent by the multi-mode mobile station used to identify the multi-mode mobile station may include one or more of: an international mobile subscriber identity (IMSI), an integrated circuit card identity (ICCID), a mobile system integrated services digital network (MSISDN), a Personal Identification Number (PIN), electronic serial number (ESN) and an international mobile equipment identity (IMEI). More generally, the multi-mode mobile station identifies itself by any multi-mode mobile station specific identifier.

The information sent by the multi-mode mobile station used to identify the network serving the multi-mode mobile station 120A may include one or more of a mobile country code (MCC), a mobile network code (MNC) and location area code (LAC). More generally, the multi-mode mobile station identifies the network by any network specific identifier.

The information sent by the multi-mode mobile station used to identify the RAT used in the network generally includes any manner of identifying the RAT. For example, each type of RAT known to the configuration server is associated with a RAT identifier, such that the multi-mode mobile station sends the RAT identifier to the configuration server to identify the RAT. In some embodiments, for the RAT identifier is a bit or a series of bits. In a specific example, a GPRS RAT is identified by a bit equal to "0" and a UMTS RAT is identified by a bit equal to "1".

In some embodiments, when the multi-mode mobile station changes RATs, but remains in the same network, the multi-mode mobile station sends information to the configuration server indicating both the network and the new RAT. In some embodiments, the multi-mode mobile station sends information to the configuration server indicating the new RAT and an indication that the multi-mode mobile station is in the same network, instead of identifying the network directly.

Figure 2:
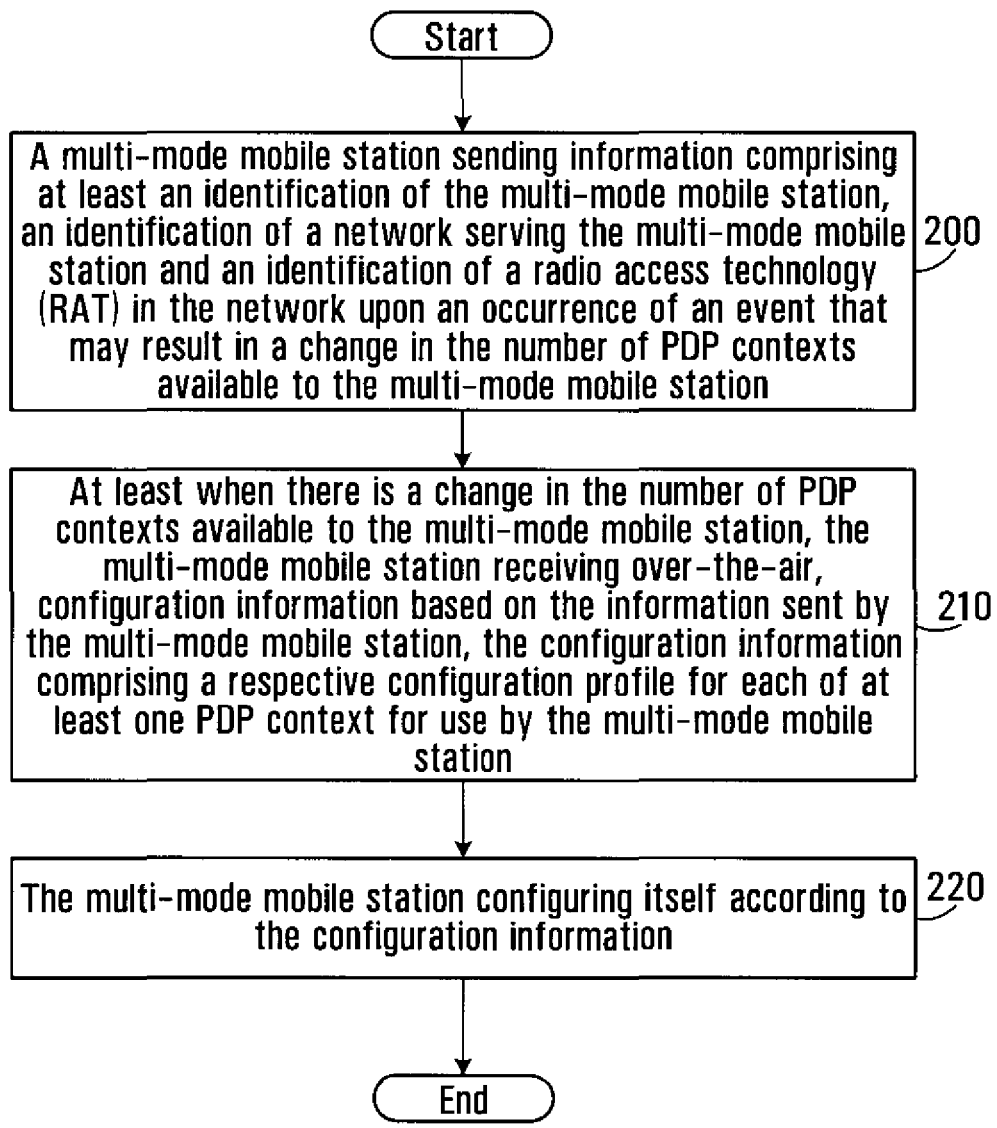
FIG. 2 is a flow chart of an example method of configuring a multi-mode mobile station.

Referring to FIG. 2, a method will now be described for configuring a multi-mode mobile station. A first step 200 involves the multi-mode mobile station sending information including at least an identification of the multi-mode mobile station, an identification of a network serving the multi-mode mobile station and an identification of a radio access technology (RAT) in the network upon an occurrence of an event that may result in a change in the number of PDP contexts available to the multi-mode mobile station. In some embodiments, a change in the number of PDP contexts available to the multi-mode mobile station results from at least one of: the multi-mode mobile station entering into the network; the multi-mode mobile station changing RATs within the network; and the multi-mode mobile station changing radio network controllers (RNC) when using a same RAT.

A second step 210 involves at least when there is a change in the number of PDP contexts available to the multi-mode mobile station the multi-mode mobile station receiving over-the-air, configuration information based on the information sent by the multi-mode mobile station. The configuration information includes a respective configuration profile for each of at least one PDP context for use by the multi-mode mobile station.

A third step 220 involves the multi-mode mobile station configuring itself according to the received configuration information.

In some embodiments, the configuration information indicates a maximum number of PDP contexts supported by the network or a portion of the network in which the multi-mode mobile station is currently located. In some embodiments, configuring the multi-mode mobile station includes enabling and disabling active PDP contexts as necessary in accordance with the maximum number of PDP contexts supported. In some embodiments, configuration of the multi-mode mobile station is arranged prior to a new network or an alternate RAT taking over service of the multi-mode mobile station. In such a case, when the multi-mode mobile station enters the new network and/or alternate RAT it is configured for operation in the new network and/or alternate RAT. Those skilled in the art would be familiar with handoff techniques to facilitate configuration that begins before entry into a new network and/or alternate RAT.

In other embodiments, the configuration information simply includes a number of configuration profiles that is consistent with the number of PDP contexts supported. In some embodiments each configuration profile includes profiles for each service/application operating on the respective PDP contexts. When the mobile station configures itself using these service profiles, it will necessarily use no more than the maximum number of PDP contexts supported.

In some embodiments, the multi-mode mobile station sending information including at least an identification of the multi-mode mobile station, an identification of a network serving the multi-mode mobile station and an identification of a RAT in the network occurs as part of the multi-mode mobile station registering with the network. In some embodiments, the entire processing of the multi-mode mobile station sending information, receiving configuration information and using the configuration information to configure the multi-mode mobile station occurs as part of the multi-mode mobile station registering with the network.

In some embodiments, when the multi-mode mobile station enters a new network or changes RATs, there may be a duration of time before the multi-mode mobile station is configured appropriately for the new network and/or alternate RAT. When a total number of available PDP contexts is less than that of a previous network, for the duration of time between entering the new network and/or alternate RAT and configuration of the multi-mode mobile station some services/applications which are not supported due to a lack of available PDP contexts are temporarily unresponsive to the multi-mode mobile station. If there are insufficient PDP contexts for all services/applications subscribed to by the multi-mode mobile station in the new network and/or alternate RAT, when the multi-mode mobile station is configured and made aware that there are insufficient PDP contexts, the multi-mode mobile station disables some of the PDP contexts and suspends the services/applications utilizing those PDP contexts until such time as there is an available resource to support the services/applications.

In some embodiments, when the maximum number M of PDP contexts supported in a new network and/or RAT used in the network, where M>=1 is less than the number N of PDP contexts that were active in a previous network and/or RAT, where N>=2, the number of active PDP contexts is reduced to M active PDP contexts. In some embodiments, the number of PDP contexts is reduced to a single active PDP context when entering a new network and/or RAT used in the network.

In some embodiments, when the maximum number M of PDP contexts in a new network and/or RAT used in the network is greater than the maximum number of PDP contexts N that were active in a previous network and/or RAT, the number of active PDP contexts is increased to as many as M active PDP contexts to accommodate services/applications subscribed to by the multi-mode mobile station on the increased number of active PDP contexts.

In some embodiments, data from N separate services/applications are transmitted by the multi-mode mobile station on the M PDP contexts, where N≥2 and 1≤M<N. In some embodiments, the wireless connection between the multi-mode mobile station and the base station serving it allow all subscribed to services/applications to be enabled over a single PDP context.

In some embodiments, data from N separate services/applications on the single PDP context comprises sending data to a specific network or relay network.

In some embodiments, all the traffic from the N services/applications is provided to a network server that is not operated by a service provider to which the multi-mode mobile station subscribes to for services/applications, but that is capable of providing one or more of the services/applications, or directing traffic to network servers of the network provider assigned dedicated to provide the services/applications. In some embodiments, the network server is operated by a provider of a service/application that the service provider is utilizing to provide the service/application to the subscriber. In some embodiments, the network server is operated by the service provider and the network server routes traffic to providers of the respective services/applications.

In some embodiments, packet based traffic from all of the N services/applications is transmitted on a single active PDP context. The packet based traffic is sent to a router that determines from packet header information in the packet based traffic a particular service/application the packet based traffic is associated with. For example, the different services/applications may use a different port number in the header, and these different port numbers can be used to distinguish the packets of the different services/applications that are transmitted on the same PDP context. The router routes the packet based traffic to an appropriate destination, for example a network server that is dedicated to provide the particular service/application.

In either case described above for routing M services/applications through a single active PDP context, the routing is transparent to the user of the multi-mode mobile station. That is, regardless of the manner by which the traffic is handled the services/applications are available to the user. For example, one manner of routing M services/applications through a single active PDP context is for the multi-mode mobile station to transmit traffic generated from different services/applications to a different destination port or IP address. The router will route the traffic appropriately based on the destination port or IP address.

When a number of PDP contexts is reduced upon entry into a new network and RAT, but the number of PDP contexts is more than one, some of the PDP contexts may be operated in the manner as above for a single PDP context, that is more than one service/application on at least one of the more than one PDP contexts.

In some embodiments, one or more service/application is an always-on service/application.

Figure 3:
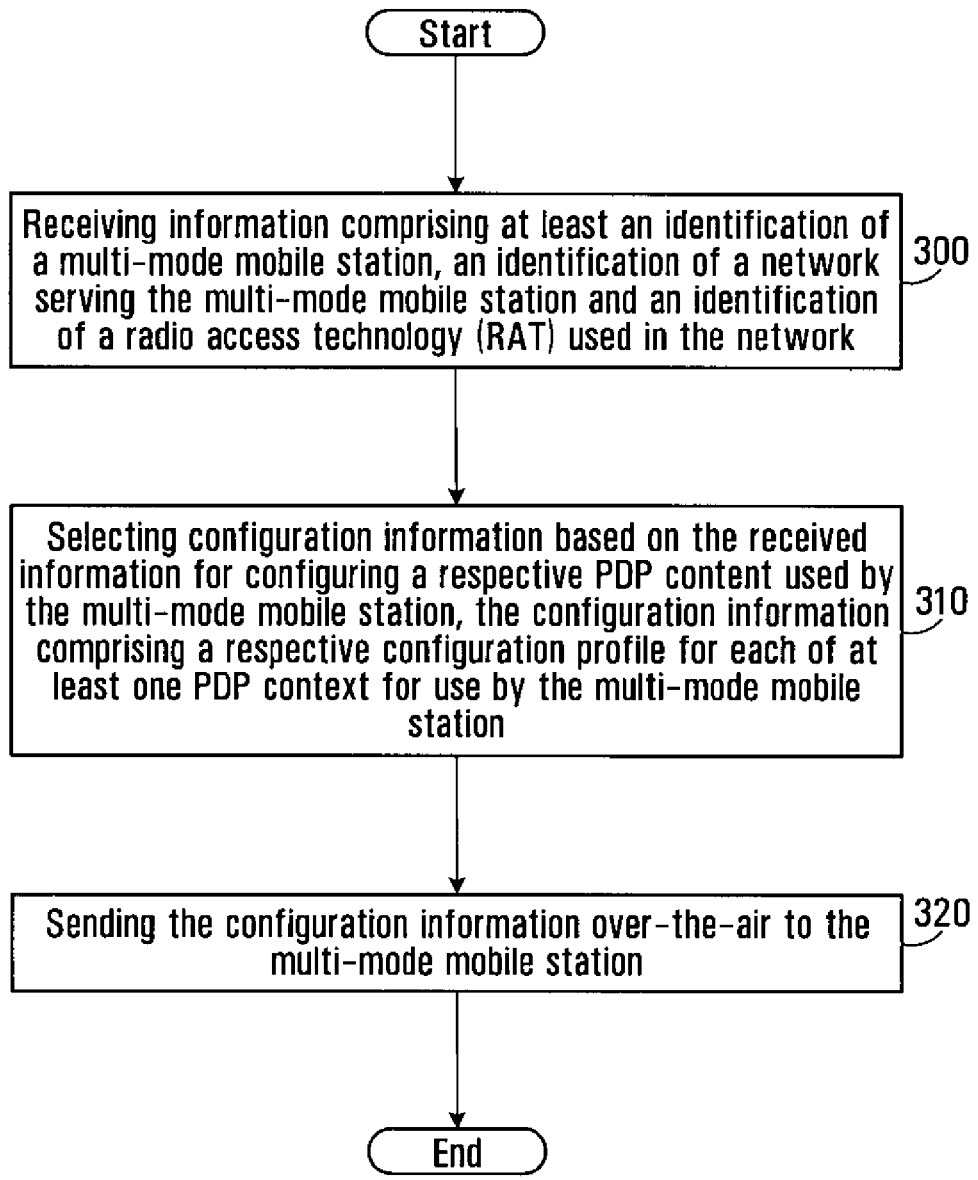
FIG. 3 is a flow chart of an example method of configuring a multi-mode mobile station over the air.

Referring to FIG. 3, a method will now be described for configuring the multi-mode mobile station over the air. A first step 300 involves a configuration server receiving information sent by a multi-mode mobile station including at least an identification of the multi-mode mobile station, an identification of the network serving the multi-mode mobile station and an identification of the RAT used in the network. A second step 310 involves the configuration server selecting configuration information based on the received information for configuring a respective PDP context used by the multi-mode mobile station, the configuration information comprising a respective configuration profile for each of at least one PDP context for use by the multi-mode mobile station. A third step 320 involves sending the configuration information over-the-air to the multi-mode mobile station.

In some embodiments, selecting configuration information includes selecting configuration information that will configure the multi-mode mobile station to enable a total number of PDP contexts that is no larger than a number of PDP contexts supported in the network and RAT.

In some embodiments, the method further includes determining a total number of PDP contexts supported by the network or RAT based on the information received from the multi-mode mobile station.

In some embodiments, the method further includes defining a respective configuration profile for each of at least two different groups of supported PDP contexts, the at least two different groups each having a different number of PDP contexts, and then selecting appropriate configuration information. Selecting the appropriate configuration information includes selecting the respective configuration profile for the determined number of supported PDP contexts.

In some embodiments, the configuration information may be implemented in a format referred to as a "service book". In some embodiments, a service book is used to define a configuration or provision resources for each service/application operating on the multi-mode mobile device. Examples of service books may include a WAP service book, a MMS service book, and a push e-mail service book. A group of service books may be referred to as a "service book profile". With regard to the example described above, the respective configuration profiles may correspond to respective service book profiles for each of at least two different groups of supported PDP contexts, the at least two different groups each having a different number of PDP contexts. An appropriate service book profile is then selected from the respective service book profiles based on the determined number of supported PDP contexts.

Figure 4:
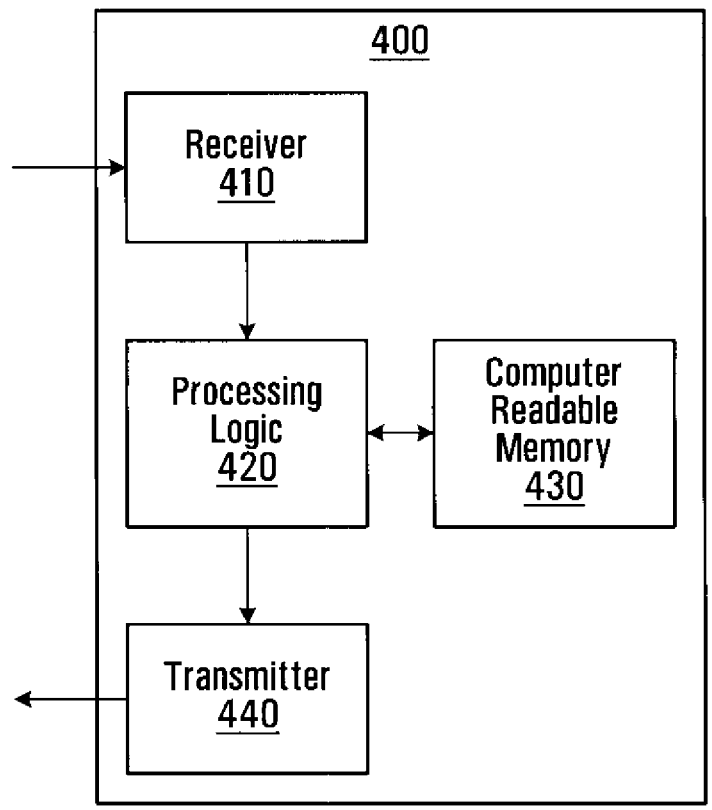
FIG. 4 is a block diagram of an apparatus for configuring a multi-mode mobile station over the air.

Referring now to FIG. 4, an example of a configuration server, generally indicated at 400 will be described in further detail. The configuration server 400 includes a receiver 410 for receiving information that describes the network in a sufficient manner and identifies the multi-mode mobile station. In some embodiments the received information includes at least an identification of a multi-mode mobile station, an identification of a network serving the multi-mode mobile station and an identification of a radio access technology (RAT) used in the network. The receiver 410 is coupled to a processing logic 420 for selecting configuration information for configuring a respective PDP context used by the multi-mode mobile station based on the information received by receiver 410. A computer readable memory 430 is accessible to the processing logic 420 for storing configuration information and multi-mode mobile station specific information used in selecting the appropriate configuration information. The processing logic 420 is coupled to a transmitter 440 for sending the appropriate configuration information.

The processing logic can be implemented using one of software, hardware, and firmware, or a suitable combination thereof. For example, application specific integrated circuits (ASIC) or field programmable gate arrays (FPGA) may be used to implement the processing logic in hardware. To implement the processing logic in software, in some embodiments, a microprocessor is used capable of executing computer readable program code instructions.

In some embodiments, the receiver 410 and transmitter 440 are respective physical ports on the configuration server. In some embodiments, the receiver 410 and transmitter 440 include other software or hardware in addition to the respective physical ports for receiving the information from the multi-mode mobile station and providing it to the processing logic and for receiving the configuration information from the processing logic and transmitting it to the multi-mode mobile station.

In some embodiments, the configuration server may be coupled to a relay server that receives information sufficient to define the network and the identity of the multi-mode mobile station. The relay server then provides the information to the configuration server for processing by the processing logic. In such implementations, the relay server is coupled to the configuration server and provides the information sent by the multi-mode mobile station to the configuration server and receives the configuration information from the configuration server to transmit to the multi-mode mobile station.

In some implementations, the configuration information stored in the computer readable memory 430 includes information specific to each network for which the configuration server has generated the configuration information. For example, the computer readable memory 430 may include configuration information for each service/application supported by a network and a RAT used in the network. As a particular example, the computer readable memory 430 may include configuration information specific to each of WAP, MMS, and push e-mail services/applications for network 100 of FIG. 1 in which the RAT for network 100 is a GPRS RAT. If network 100 also has a UMTS RAT, the computer readable memory 430 may also include configuration information specific to network 100 for each of WAP, MMS, and push e-mail services/applications.

In some implementations, the multi-mode mobile station specific information stored in the computer readable memory 430 includes, but is not limited to one or more of: a multi-mode mobile station identity, a list of services/applications subscribed to by a user of a respective multi-mode mobile station and a prioritized list of services/applications the user of the respective multi-mode mobile station desires if some services/applications are not able to be maintained when the respective multi-mode mobile station is configured.

Additionally, in some implementations, behavioural algorithms may be stored per mobile station where the number of PDP contexts is less than a desired amount. Such behavioural algorithms may be accessed directly from the configuration server memory or be associated with a pointer or reference value that is used to access the algorithm. In some embodiments, the behavioural algorithms are multi-mode mobile station preference functions. Such preference functions may include for example one or more of setting push email "on" regardless of what activities a user of a multi-mode mobile station requests, setting push email "off" for a specified maximum amount of time, and setting a hierarchy of preferred services/applications. Various algorithms for many different purposes can be devised by any of the wireless provider, the service provider and even the user of the multi-mode mobile station. In some embodiments computer readable memory 430 also contains configuration information for different respective networks and RATs used in the different respective networks based on the configuration being previously selected for a given multi-mode mobile station.

The computer readable memory 430 may be any conventional type of computer hard drive.

In some embodiments, the configuration server generates the configuration information based on information about the network and the RAT used in the network. For example, the processing logic receives information regarding the network and/or RAT and from the network service provider of the network. The processing logic uses this information to generate configuration information specific to the network and RAT.

In some implementations the service provider provides information to the configuration server pertaining to multi-mode mobile stations. For example, in some embodiments, the service provider provides the configuration server with information such as the multi-mode mobile station identity and a list of services/applications to which the user of the multi-mode mobile station subscribes. More generally, the service provider provides any information to the configuration server regarding the multi-mode mobile station that would be helpful in selecting configuration information. For example, in some embodiments, the user of the multi-mode mobile station may provide the service provider with a prioritized list of services/applications the user would prefer if the number of PDP contexts is reduced, and not all services/applications are available to the user. The service provider may then provide this prioritized list to the configuration server.

In some embodiments, when a network has more than one RAT, the configuration server generates configuration information for each RAT of the network. In some embodiments, once the processing logic generates configuration information for a particular network and RAT it can be maintained in the computer readable memory in a memory location in which it can be used for any multi-mode mobile station that sends information identifying that particular network and RAT. In some embodiments, the configuration information can be maintained in the computer readable memory in a memory location in which it is associated with a particular multi-mode mobile station that sent information identifying a particular network and RAT. In this manner, the configuration server maintains a list of configuration information for each multi-mode mobile station for various networks that the respective multi-mode mobile station access when roaming. In some embodiments such configuration information may be maintained for a particular time period and is deleted if the multi-mode mobile station does not visit the same network twice within a given time duration. In some embodiments, the configuration server may only maintain configuration information in the computer readable memory for a particular multi-mode mobile station if the multi-mode mobile station visits the network a given number of times in a given time duration.

Information about the network provided by the network service provider may be provided prior to the initialization of the network, after initialization of the network, or anytime during operation of the network. In some embodiments, upon changes to the network and/or RAT, the network service provider provides updated information about one or both of the network and the RAT used in the network to the configuration server. The processing logic can use updated information provided by the network service provider about the network to update the configuration information maintained in the computer readable memory for the network.

In some embodiments, the processing logic selects the configuration information based on known information about the network and RAT and based on services/applications to which the user of the multi-mode mobile station subscribes.

In some embodiments the configuration server includes a data store for example a lookup table or a data base in the computer readable memory (430) having, for each network of a plurality of networks each having at least one RAT, an identification of a number of PDP contexts supported by a respective RAT used in each network. In such embodiments, selecting the configuration information involves selecting configuration information to configure the multi-mode mobile station with a total number of PDP contexts no larger than a number supported by the respective RAT of a given network, as identified in the data store.

In some embodiments the configuration server includes a respective configuration profile definition for each of at least two different groups of supported PDP contexts, the at least two different groups each having a different number of PDP contexts. In such embodiments, the processing logic then selects the configuration information by selecting the configuration profile for the determined number of supported PDP contexts.

For networks that are unfamiliar to the configuration server, for example if the configuration server has not received information about the network from a service provider of the network, the processing logic uses information received from the multi-mode mobile station to generate configuration information for the multi-mode mobile station. For example, based on the type of RAT used in the network, the processing logic may provide configuration information for the type of RAT based on default configuration information for that type of RAT stored in the computer readable memory of the configuration profile.

In a particular example of selecting configuration information, upon receiving from the multi-mode mobile station information sufficient to define the network and the identity of the multi-mode mobile station, the processing logic accesses a portion of the computer readable memory including the configuration information for supporting services/applications in the network defined by the information sent by the multi-mode mobile station. The processing logic would also access a portion of the computer readable memory including the services/applications subscribed to by the user of the multi-mode mobile station after having identified the multi-mode mobile station based on the received information. Knowing the services/applications subscribed to by the multi-mode mobile station, the processing logic selects configuration information for the subscribed to services from the portion of the computer readable memory including the configuration information for supporting services/applications in the network. The selected configuration information for the services/applications subscribed to by the multi-mode mobile station are then sent to the multi-mode mobile station.

In some embodiments, a respective configuration profile is defined for each of at least two different numbers of supported PDP contexts, each configuration profile containing service profiles consistent with the number of services/applications supported on each context of the respective configuration profile. Then, selecting the configuration information involves selecting the configuration profile for the determined number of supported PDP contexts.

The description has focussed on multi-mode mobile stations that are mobile stations that have the capability to access different types of radio access systems. Existing multi-mode mobile stations include mobile stations with a combination of GSM/GPRS and CDMA capabilities, and mobile stations with a combination of GSM/GPRS/UMTS and CDMA capabilities. More generally, other embodiments are applicable to multi-mode mobile stations with other RAT capabilities, for example CDMA, iDEN (integrated digital enhanced network), WiFi, Bluetooth, WiMAX and wireless LAN (WLAN).

The description throughout has referred to the management of PDP contexts. A PDP context is typically defined by a multi-mode mobile station IP address, a multi-mode mobile station IMSI, and a multi-mode mobile station tunnel ID to identify traffic as related to a particular PDP context. More generally, all of the embodiments described can be applied to management of data sessions. A PDP context is a specific example of a data session. For example, the methods may be used to manage IP data sessions that do not necessarily have all of the other parameters normally associated with PDP contexts. An example of such an IP data session is a point-to-point (PPP) data session using Mobile IP or Simple Mobile IP in 3GPP2.

Figure 5:
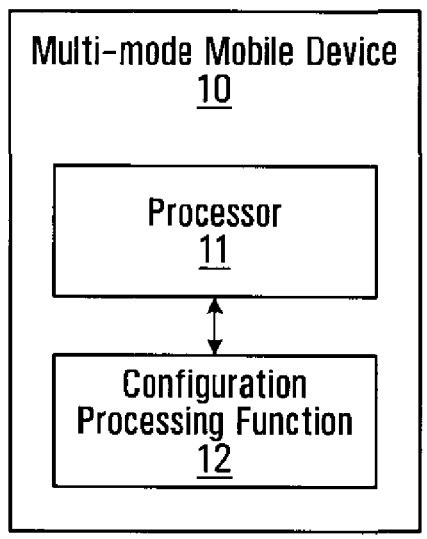
FIG. 5 is a block diagram of an example multi-mode device adapted to communicate with a configuration server to enable over the air configuration of the multi-mode device.

Referring now to FIG. 5, shown is a block diagram of an example multi-mode mobile device 10 adapted to communicate using circuit switched and packet switched communications separately or simultaneously, and communicate with a configuration server to enable over the air configuration of the multi-mode mobile device 10. The multi-mode mobile device 10 has a processor 11 coupled to a configuration processing function 12.

In operation, the multi-mode mobile device 10 is adapted to communicate using circuit switched and packet switched communications separately or simultaneously. Circuit switched communication may include, for example, a voice call. Packet switched communication may include any data, for example, streaming video data or VoIP (Voice over IP). According to one aspect, the configuration processing function 12 operates to provide the multi-mode mobile device 10 with functionality of sending information comprising at least an identification of the multi-mode mobile device to the configuration server, the multi-mode mobile device 10 receiving over-the-air, configuration information based on the information sent by the multi-mode mobile device 10, and the multi-mode mobile device 10 configuring itself according to the configuration information. An example of how this may be accomplished is described above with reference to FIG. 2. In some embodiments, the configuration processing function 12 is software implemented and may be executed by the processor 11. However, more generally, the configuration processing function 12 may be implemented as software, hardware, firmware, or as any appropriate combination of software, hardware and firmware.

Figure 6:
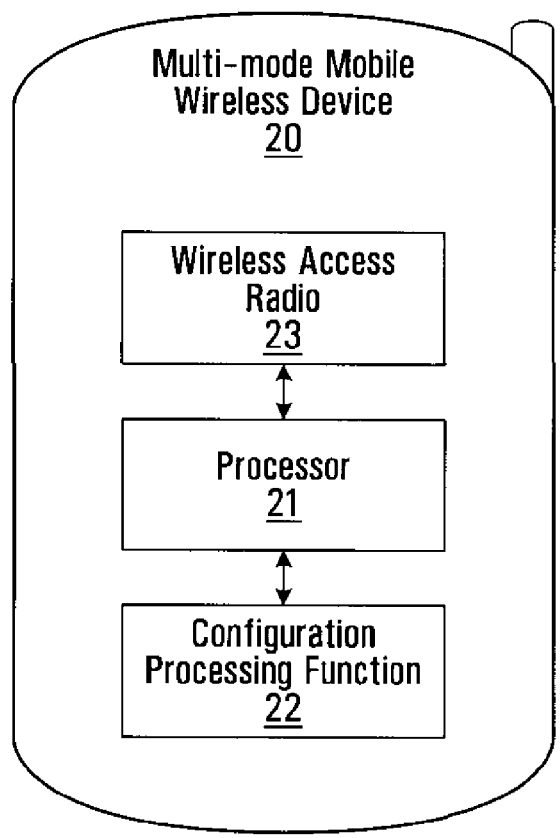
FIG. 6 is a block diagram of an example wireless device adapted to communicate with a configuration server to enable over the air configuration of the wireless device.

Referring now to FIG. 6, shown is a block diagram of an example multi-mode wireless device 20 adapted to communicate using circuit switched and packet switched communications separately or simultaneously, and communicate with a configuration server to enable over the air configuration of the multi-mode wireless device 20. The multi-mode wireless device 20 has a processor 21 coupled to a wireless access radio 23 and a configuration processing function 22.

In operation, the multi-mode wireless device 20 is adapted to communicate wirelessly over a wireless communication network, for example a cellular network (for example as shown in FIG. 1), using the wireless access radio 23. The multi-mode wireless device 20 is adapted to communicate using circuit switched and packet switched communications separately or simultaneously. According to one aspect, the configuration processing function 22 provides the multi-mode wireless device 20 with functionality of sending information comprising at least an identification of the multi-mode wireless device 20 to the configuration server, the multi-mode wireless device 20 receiving over-the-air, configuration information based on the information sent by the multi-mode wireless device 20, and the multi-mode wireless device 20 configuring itself according to the configuration information.

In some embodiments, the configuration processing function 22 is software implemented and may be executed by the processor 21. However, more generally, the configuration processing function 22 may be implemented as software, hardware, firmware, or as any appropriate combination of software, hardware and firmware.

The devices of FIGS. 5 and 6 show only functionality relevant to the aspects described herein. It is to be understood that practical implementations would include additional functionality to that shown.

Figure 7:
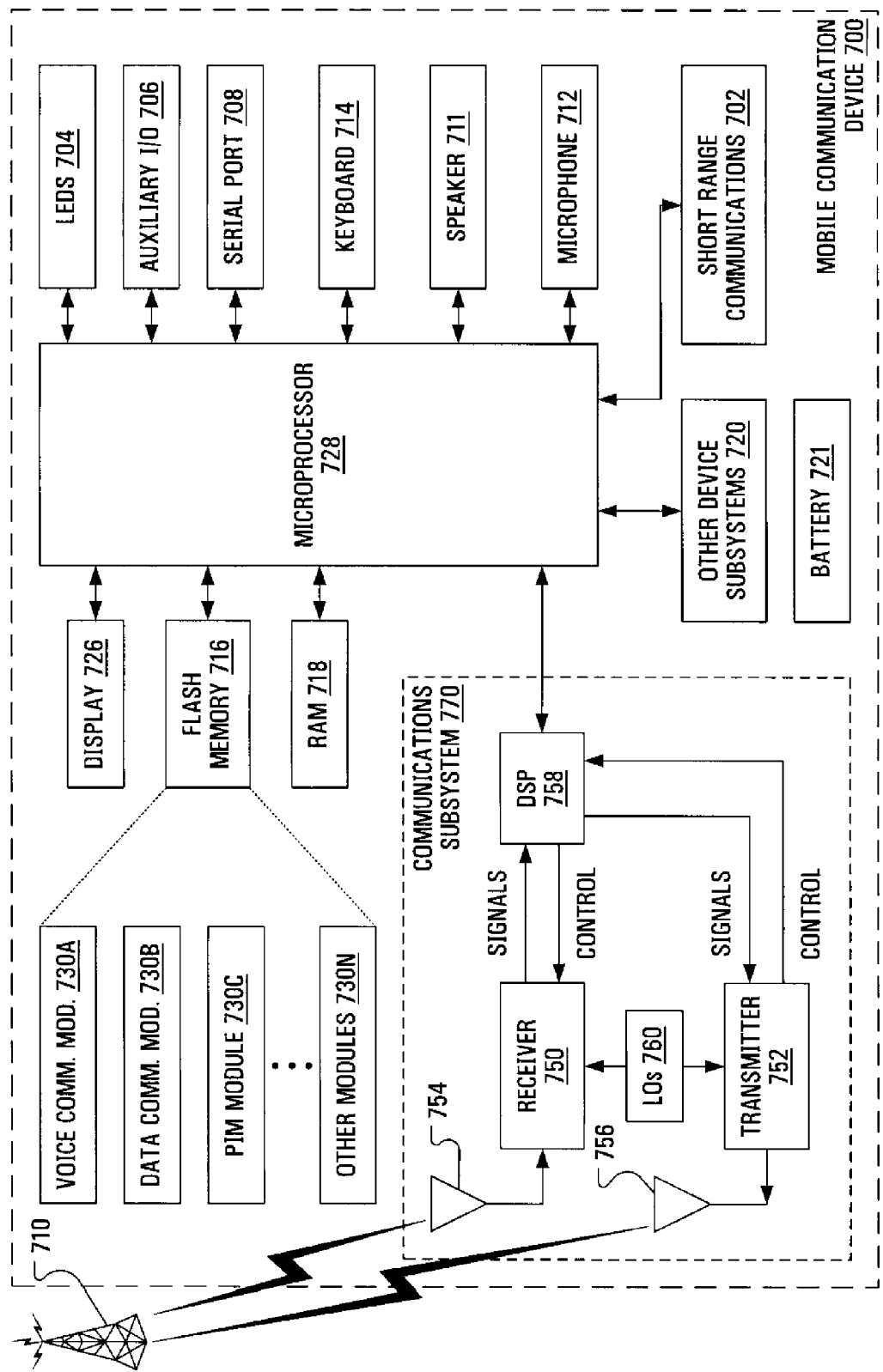
FIG. 7 is a block diagram of an example mobile communication device.

Referring now to FIG. 7, shown is a block diagram of a mobile communication device 700 that may implement mobile device related methods described herein. It is to be understood that the mobile device 700 is shown with very specific details for example purposes only.

A processing device (a microprocessor 728) is shown schematically as coupled between a keyboard 714 and a display 726. The microprocessor 728 controls operation of the display 726, as well as overall operation of the mobile device 700, in response to actuation of keys on the keyboard 714 by a user.

The mobile device 700 has a housing that may be elongated vertically, or may take on other sizes and shapes (including clamshell housing structures). The keyboard 714 may include a mode selection key, or other hardware or software for switching between text entry and telephony entry.

In addition to the microprocessor 728, other parts of the mobile device 700 are shown schematically. These include: a communications subsystem 770; a short-range communications subsystem 702; the keyboard 714 and the display 726, along with other input/output devices including a set of LEDS 704, a set of auxiliary I/O devices 706, a serial port 708, a speaker 711 and a microphone 712; as well as memory devices including a flash memory 716 and a Random Access Memory (RAM) 718; and various other device subsystems 720. The mobile device 700 may have a battery 721 to power the active elements of the mobile device 700. The mobile device 700 is in some embodiments a two-way radio frequency (RF) communication device having voice and data communication capabilities. In addition, the mobile device 700 in some embodiments has the capability to communicate with other computer systems via the Internet.

Operating system software executed by the microprocessor 728 is in some embodiments stored in a persistent store, such as the flash memory 716, but may be stored in other types of memory devices, such as a read only memory (ROM) or similar storage element. In addition, system software, specific device applications, or parts thereof, may be temporarily loaded into a volatile store, such as the RAM 718. Communication signals received by the mobile device 700 may also be stored to the RAM 718.

The microprocessor 728, in addition to its operating system functions, enables execution of software applications on the mobile device 700. A predetermined set of software applications that control basic device operations, such as a voice communications module 730A and a data communications module 730B, may be installed on the mobile device 700 during manufacture. In addition, a personal information manager (PIM) application module 730C may also be installed on the mobile device 700 during manufacture. The PIM application is in some embodiments capable of organizing and managing data items, such as e-mail, calendar events, voice mails, appointments, and task items. The PIM application is also in some embodiments capable of sending and receiving data items via a wireless network 710. In some embodiments, the data items managed by the PIM application are seamlessly integrated, synchronized and updated via the wireless network 710 with the device user's corresponding data items stored or associated with a host computer system. As well, additional software modules, illustrated as other software module 730N, may be installed during manufacture.

The configuration processing function of FIGS. 5 and 6 is an example of functionality that is included in a software module stored in memory. Information identifying the mobile device can be stored in the Flash Memory 716 or RAM 718. The information identifying the mobile device is transmitted to the configuration server, as described for example with regard to FIG. 2, via the wireless network 710 using transmitter 752 and antenna 752. Configuration information received from the configuration server for configuring the mobile device is received via the wireless network 710 over the air by antenna 754 and receiver 750. The configuration information may be stored in the Flash Memory 716 or RAM 718.

Communication functions, including data and voice communications, are performed through the communication subsystem 770, and possibly through the short-range communications subsystem 702. The communication subsystem 770 includes a receiver 750, a transmitter 752 and one or more antennas, illustrated as a receive antenna 754 and a transmit antenna 756. In addition, the communication subsystem 770 also includes a processing module, such as a digital signal processor (DSP) 758, and local oscillators (LOs) 760. The specific design and implementation of the communication subsystem 770 is dependent upon the communication network in which the mobile device 700 is intended to operate. For example, the communication subsystem 770 of the mobile device 700 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communications Service (PCS), Global System for Mobile Communications (GSM), etc. Other types of data and voice networks, both separate and integrated, may also be utilized with the mobile device 700.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 700 may send and receive communication signals over the communication network 710. Signals received from the communication network 710 by the receive antenna 754 are routed to the receiver 750, which provides for signal amplification, frequency down conversion, filtering, channel selection, etc., and may also provide analog to digital conversion. Analog-to-digital conversion of the received signal allows the DSP 758 to perform more complex communication functions, such as demodulation and decoding. In a similar manner, signals to be transmitted to the network 710 are processed (e.g., modulated and encoded) by the DSP 758 and are then provided to the transmitter 752 for digital to analog conversion, frequency up conversion, filtering, amplification and transmission to the communication network 710 (or networks) via the transmit antenna 756.

In addition to processing communication signals, the DSP 758 provides for control of the receiver 750 and the transmitter 752. For example, gains applied to communication signals in the receiver 750 and the transmitter 752 may be adaptively controlled through automatic gain control algorithms implemented in the DSP 758.

In a data communication mode, a received signal, such as a text message or web page download, is processed by the communication subsystem 770 and is input to the microprocessor 728. The received signal is then further processed by the microprocessor 728 for an output to the display 726, or alternatively to some other auxiliary I/O devices 706. A device user may also compose data items, such as e-mail messages, using the keyboard 714 and/or some other auxiliary I/O device 706, such as a touchpad, a rocker switch, a thumb-wheel, or some other type of input device. The composed data items may then be transmitted over the communication network 710 via the communication subsystem 770.

In a voice communication mode, overall operation of the device is substantially similar to the data communication mode, except that received signals are output to a speaker 711, and signals for transmission are generated by a microphone 712. Alternative voice or audio I/O subsystems, such as a voice message recording subsystem, may also be implemented on the mobile device 700. In addition, the display 716 may also be utilized in voice communication mode, for example, to display the identity of a calling party, the duration of a voice call, or other voice call related information.

The short-range communications subsystem 702 enables communication between the mobile device 700 and other proximate systems or devices, which need not necessarily be similar devices. For example, the short-range communications subsystem may include an infrared device and associated circuits and components, or a Bluetooth™ communication module to provide for communication with similarly-enabled systems and devices.

Numerous modifications and variations of the present application are possible in light of the above teachings. It is therefore to be understood that within the scope of the appended claims, the subject matter of the present application may be practised otherwise than as specifically described herein.

The invention claimed is:

1. A method for configuring a multi-mode mobile station comprising:
the multi-mode mobile station sending information comprising at least an identification of the multi-mode mobile station, an identification of a network serving the multi-mode mobile station and an identification of a current radio access technology (RAT) in the serving network upon an occurrence of an event that may result in a change in the number of data sessions available to the multi-mode mobile station;
when there is a change in the number of data sessions available to the multi-mode mobile station the multi-mode mobile station receiving over-the-air, configuration information for the current RAT in the serving network based on the information sent by the multi-mode mobile station, the configuration information comprising a respective configuration profile for each of at least one data session for use by the multi-mode mobile station;
the multi-mode mobile station configuring itself according to the configuration information.

2. The method of claim 1 wherein an occurrence of an event that may result in a change in the number of data sessions available to the multi-mode mobile station comprises at least one of: the multi-mode mobile station entering into the serving network; the multi-mode mobile station changing RATs within the serving network; and the multi-mode mobile station changing radio network controllers (RNC) in the serving network.

3. The method of claim 1 wherein the configuration information limits a total number of data sessions to be used by the multi-mode mobile station to be no larger than a number of data sessions supported in the serving network and the current RAT.

4. The method of claim 1 wherein sending information upon an occurrence of an event that may result in a change in the number of data sessions available to the multi-mode mobile station comprises sending at least one of:
a mobile country code (MCC), a mobile network code (MNC), a location area code (LAC), an international mobile subscriber identity (IMSI), an integrated circuit card identity (ICCID), a mobile system integrated services digital network (MSISDN), a Personal Identification Number (PIN), electronic serial number (ESN) and an international mobile equipment identity (IMEI).

5. The method of claim 1, wherein sending information comprising an identification of a current RAT used in the serving network comprises identifying the current RAT as one of: General Packet Radio Service (GPRS), Universal Mobile Telecommunications System (UMTS), Code Division Multiple Access (CDMA), integrated digital enhanced network (iDEN), WiFi, Bluetooth and WiMAX.

6. The method of claim 1, wherein the configuration information indicates a maximum number of concurrent data sessions supported and configuring the multi-mode mobile station according to the configuration information comprises:
the multi-mode mobile station dropping active data sessions as necessary to meet the maximum number of data sessions supported.

7. The method of claim 6, wherein the maximum number of concurrent data sessions is a maximum number of packet data protocol (PDP) contexts.

8. The method of claim 7 wherein dropping active PDP contexts as necessary to meet the maximum number of PDP contexts supported comprises dropping all but one active PDP context.

9. The method of claim 7 further comprising sending data for N services/applications on M PDP contexts, where N≥2, and 1≤M<N.

10. The method of claim 9 wherein sending data for N services/applications on less than N PDP contexts comprises sending data for N services/applications on one PDP context.

11. The method of claim 10, further comprising sending data for N services/applications on the one active PDP context, wherein sending data comprises:
sending packet based traffic of each of the N services/applications to a router adapted to determine from packet header information in the packet based traffic a particular service/application the packet based traffic is associated with.

12. The method of claim 9, wherein at least one service/application of the N services/applications comprises an always-on service/application.

13. The method of claim 9, wherein the N service/applications comprise one or more types of services/applications selected from the group of: wireless application protocol (WAP) service, mobile message service (MMS) wireless modem service, SIP/IMS (Session Initiation Protocol /IP Multimedia Subsystem) service and push e-mail service.

14. The method of claim 1, wherein configuring the multi-mode mobile station comprises enabling and disabling services/applications for use by the multi-mode mobile station as a function of the configuration information.

15. A method for configuring a multi-mode mobile station over the air comprising:
   receiving information comprising at least an identification of the multi-mode mobile station, an identification of a network serving the multi-mode mobile station and an identification of a current radio access technology (RAT) used in the serving network, upon an occurrence of an event that may result in a change in the number of data sessions available to the multi-mode mobile station;
   selecting configuration information for the current RAT in the serving network based on the received information for configuring a respective data session used by the multi-mode mobile station, the configuration information comprising a respective configuration profile for each of at least one data session;
   when there is a change in the number of data sessions available to the multi-mode mobile station, sending the configuration information over-the-air to the multi-mode mobile station.

16. The method of claim 15 wherein selecting configuration information comprises selecting configuration information that will configure the multi-mode mobile station to enable a total number of data sessions that is no larger than a number of data sessions supported in the serving network and current RAT.

17. The method of claim 16 further comprising:
   determining the total number of data sessions supported by the serving network or current RAT based on the information received from the multi-mode mobile station.

18. The method of claim 16 further comprising:
   defining a respective configuration profile for each of at least two different groups of supported data sessions, the at least two different groups each having a different number of data sessions;
   selecting the configuration information comprises selecting the respective configuration profile for the determined number of supported data sessions.

19. The method of claim 15, further comprising maintaining information associated with at least one multi-mode mobile station comprising one or more of: a multi-mode mobile station identity, a list of services/applications subscribed to by a user of a respective multi-mode mobile station, configuration information for different respective networks and RATs used in the different respective networks based on the list of services/applications subscribed to by the user of the respective multi-mode mobile station, configuration profiles that have been defined previously for particular networks the multi-mode mobile station has operated within and a prioritized list of services/applications the user of the respective multi-mode mobile station desires if some services/applications are not able to be maintained when the respective multi-mode mobile station is configured.

20. An apparatus comprising:
   a receiver for receiving information comprising at least an identification of a multi-mode mobile station, an identification of a network serving the multi-mode mobile station and an identification of a current radio access technology (RAT) used in the serving network, upon an occurrence of an event that may result in a change in the number of data sessions available to the multi-mode mobile station;
   processing logic for selecting configuration information for the serving network for configuring a respective data session used by the multi-mode mobile station based on the received information;
   computer readable memory for storing configuration information for at least one network and multi-mode mobile station specific information used in selecting the appropriate configuration information;
   a transmitter for sending the appropriate configuration information for the current RAT in the serving network when there is a change in the number of data sessions available to the multi-mode mobile station.

* * * * *